US008645846B2

(12) United States Patent  (10) Patent No.: US 8,645,846 B2
Cragun et al.  (45) Date of Patent: Feb. 4, 2014

(54) ACCESSIBILITY IN VIRTUAL WORLDS USING TAGS

(75) Inventors: Brian John Cragun, Rochester, MN (US); Zachary Adam Garbow, Rochester, MN (US); Christopher A. Peterson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 12/034,119

(22) Filed: Feb. 20, 2008

(65) Prior Publication Data

US 2009/0210797 A1     Aug. 20, 2009

(51) Int. Cl.
*G06F 3/048* (2013.01)
*G06F 3/00* (2006.01)

(52) U.S. Cl.
USPC ............ 715/757; 715/706; 715/729; 715/850

(58) Field of Classification Search
USPC ......... 715/839, 758, 757, 706, 850, 852, 729; 434/116; 704/270, 271; 463/28, 30, 32
See application file for complete search history.

(56) References Cited

U.S. PATENT DOCUMENTS

| | | | |
|---|---|---|---|
| 6,219,045 B1* | 4/2001 | Leahy et al. | 715/757 |
| 6,366,285 B1* | 4/2002 | Brush et al. | 345/473 |
| 6,950,791 B1* | 9/2005 | Bray et al. | 703/22 |
| 7,139,984 B2* | 11/2006 | Beaumont et al. | 715/848 |
| 2003/0174178 A1* | 9/2003 | Hodges | 345/848 |
| 2005/0256796 A1* | 11/2005 | Haga et al. | 705/37 |
| 2007/0075993 A1* | 4/2007 | Nakanishi et al. | 345/419 |
| 2007/0174247 A1* | 7/2007 | Xu et al. | 707/748 |
| 2008/0147424 A1* | 6/2008 | Rowan et al. | 705/1 |
| 2009/0158161 A1* | 6/2009 | Gibbs et al. | 715/733 |
| 2009/0183071 A1* | 7/2009 | Smith et al. | 715/706 |

FOREIGN PATENT DOCUMENTS

WO     WO-02054303     * 7/2002

OTHER PUBLICATIONS

Tom Peters; Lori Bell, MUVEing Toward Accessibility, Apr. 2007, Computers in Libraries 27, p. 34.*
Cragun, et al, Patent Application "Accessibility in Virtual Worlds Using Tags", filed Feb. 20, 2008.

* cited by examiner

*Primary Examiner* — Boris Pesin
*Assistant Examiner* — Matthew Ell
(74) *Attorney, Agent, or Firm* — Patterson & Sheridan LLP

(57) ABSTRACT

Embodiments of the invention include a method and apparatus for describing elements within a virtual world to a user of the virtual world. An element may be identified based on a position of an avatar within the virtual world. The avatar is a representation of the user within the virtual world. A tag associated with the element is selected. The tag includes a description of the element. The element is described to the user based on the description.

24 Claims, 10 Drawing Sheets

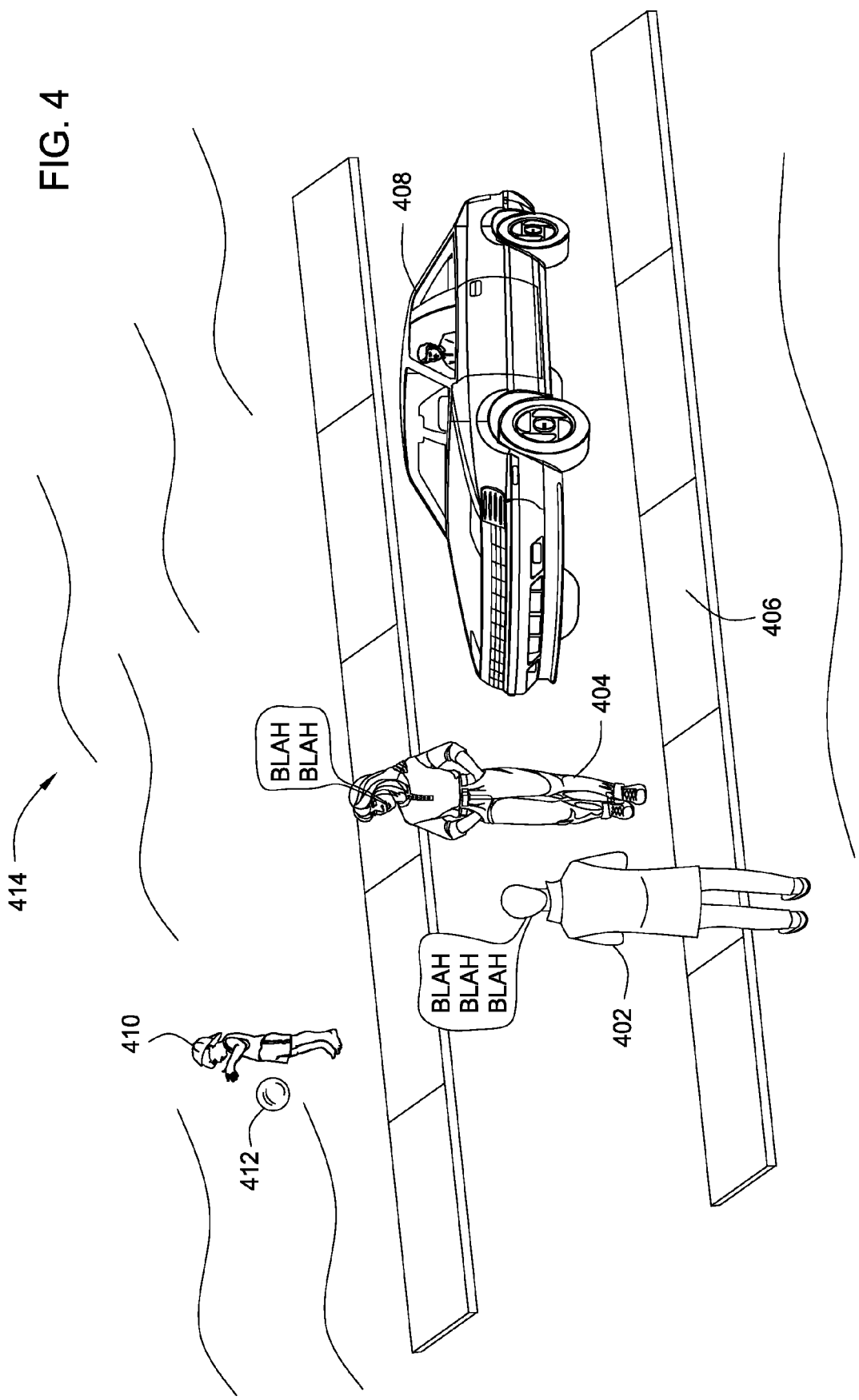

| 602 TAG SOURCE RATING | | |
|---|---|---|
| 604 ELEMENT: CAR | | |
| 606 USER NAME | 608 TAG RATING | 610 USER RATING |
| ○ JOHN SMITH | HIGH | HIGH |
| ○ BILL PUBLIC | MED | LOW |
| ○ JANE DOE | LOW | MED |

(612 brackets the three user rows)

614 — VIEW TAG DETAIL

FIG. 6

ACCESSIBILITY IN VIRTUAL WORLDS USING TAGS

BACKGROUND OF THE INVENTION

Embodiments of the invention relate to presenting users with a virtual world, and more specifically to improving accessibility in virtual worlds for disabled users using tags, filters, and fast filter switching.

DESCRIPTION OF THE RELATED ART

A virtual world is a simulated environment in which users may inhabit and interact with one another via avatars. An avatar generally provides a graphical representation of an individual within the virtual world environment. Avatars are usually presented to other users as two or three-dimensional graphical representations of humanoids. Multiple users "enter" a virtual world by logging on to a central server(s), and interact with one another through the actions of their avatars. The actions of a given avatar are typically controlled by the individual using a mouse and keyboard. Virtual worlds provide an immersive environment with an appearance typically similar to that of the real world, with real world rules such as gravity, topography, locomotion, real-time actions, and communication. Communication may be in the form of text messages sent between avatars, but may also include real-time voice chats.

Virtual worlds may be persistent between times when a given user is logged on. A persistent world provides an immersive environment (e.g., a fantasy setting used as a setting for a role-playing game) that is generally always available, and virtual world events happen continually, regardless of the presence of a given avatar. Thus, unlike more conventional online games or multi-user environments, the plot and events within a virtual world continue to develop even while some of the members are not actively controlling their characters.

SUMMARY OF THE INVENTION

Embodiments of the present invention generally provide a method and apparatus for describing elements within a virtual world to a first user of the virtual world. In one embodiment, one or more elements of the virtual world are identified based on a position of an avatar within the virtual world. The avatar is controlled by the first user. A tag associated with an element of the one or more elements is selected. The tag includes a description of the element contributed by a second user. The element is described to the first user based on the description.

According to one embodiment, a computer-readable storage medium contains a program that, when executed, performs an operation for describing an element within a virtual world to a first user of the virtual world. One or more elements of the virtual world are identified based on a position of an avatar within the virtual world. The avatar is controlled by the first user. A tag associated with an element of the one or more elements is selected. The tag includes a description of the element contributed by a second user. The element is described to the first user based on the description.

According to one embodiment, a system comprises a processor and a memory containing a program. The program, when executed by the processor describes an element within a virtual world to a first user of the virtual world. One or more elements of the virtual world are identified based on a position of an avatar within the virtual world. The avatar is controlled by the first user. A tag associated with an element of the one or more elements is selected. The tag includes a description of the element contributed by a second user. The element is described to the first user based on the description.

BRIEF DESCRIPTION OF THE DRAWINGS

So that the manner in which the above recited features, advantages and elements of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is an example screen shot of a virtual street scene that employs tags, according to one embodiment of the invention.

FIG. 6 further illustrates the example graphical user interface for displaying tags associated with a car element, according to one embodiment of the invention.

DETAILED DESCRIPTION OF THE PREFERRED EMBODIMENTS

Figure 1:
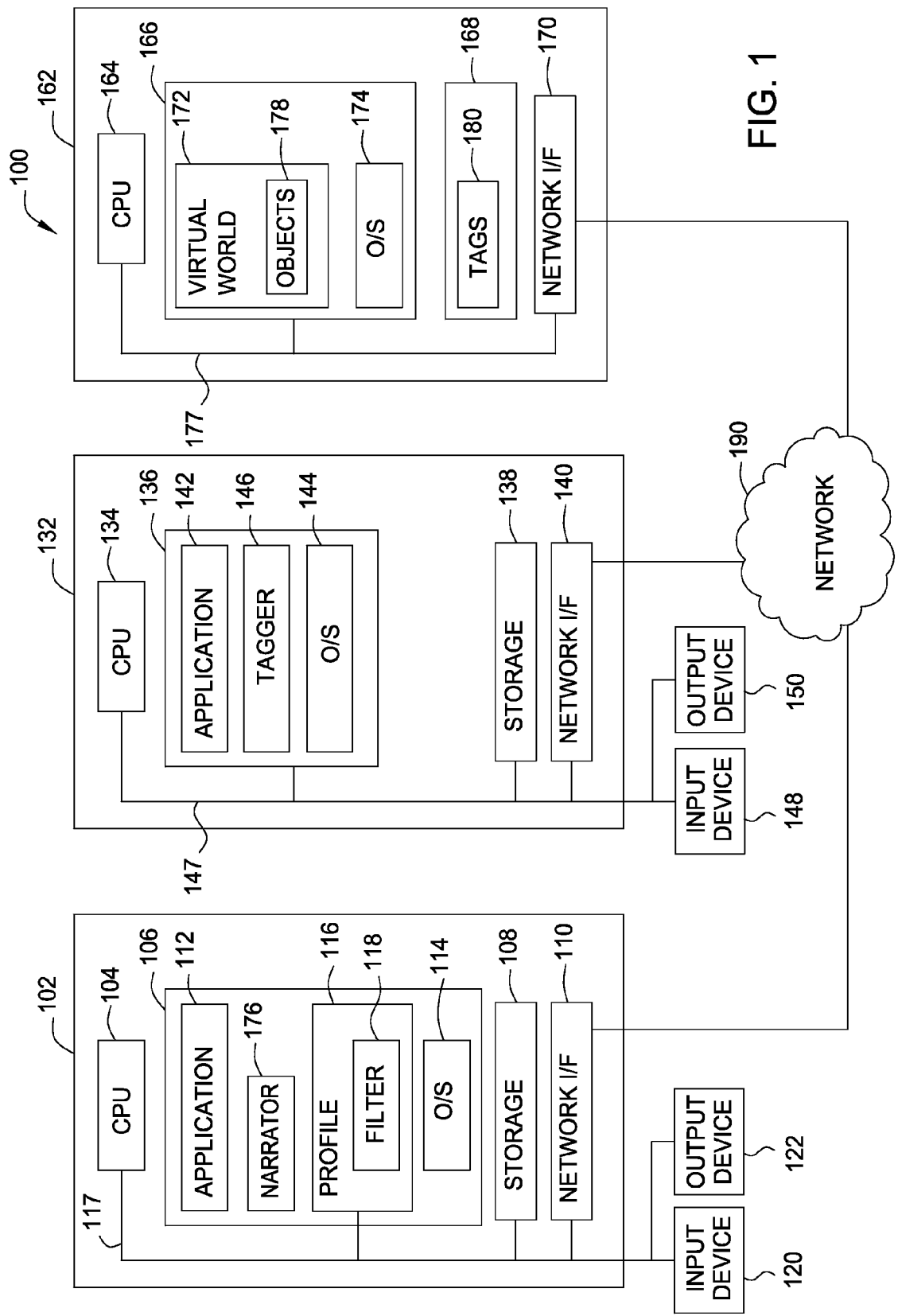
FIG. 1 is a block diagram illustrating a system configured to enhance accessibility in virtual worlds using tags, filters, and fast filter switching, according to one embodiment of the invention.

The present invention generally provides a method and apparatus for enhancing the accessibility of a virtual environment for disabled users. For example, embodiments of the invention may be implemented to describe elements within the virtual world to users exploring the virtual world. Further, the content of the descriptions may be provided (and rated) by other users of the virtual world, i.e., through a social network of users. The social network may be a community of virtual world administrative users that explore the virtual world, while tagging elements with textual and aural descriptions.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, element, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 configured to enhance accessibility in virtual worlds using tags, according to one embodiment of the invention. In general, the networked system 100 includes various client (e.g., user's) computers 102, administrator computers 132, and a virtual world server 162. As shown, the client computer 102, administrator computer 132, and virtual world server 162 are connected via a network 190. In general, the network 190 may be a telecommunications network and/or a wide area network (WAN). In a particular embodiment, the network 190 is the Internet.

The client 102 includes a Central Processing Unit (CPU) 104 connected via a bus 117 to a memory 106, a storage 108, a network interface device 110, input device 120, and output device 122. The processor 104 could be any processor used to perform an embodiment of the invention. The client 102 is generally under the control of an operating system 114, which is shown in the memory 106. Examples of operating systems 114 include UNIX, versions of the Microsoft Windows® operating system, and distributions of the Linux® operating system. (Note: Linux is at trademark of Linus Torvalds in the United States and other countries.) More generally, any operating 114 system supporting the functions disclosed herein may be used.

Illustratively, main memory 106 also includes a client application 112 and a user profile 116. In one embodiment, client application 112 provides a software program that allows a user to connect to a virtual world 172, and once connected, to explore and interact with the virtual world 172 using an avatar representation of that user. Further, client application 112 may be configured to generate and output visual and/or audio representations of elements 178 within the virtual world 172 based on visual and audio descriptions within the virtual world 172.

A narrator application 176 may be configured to describe elements 178 of the virtual world 172 to a user with visual impairments based on textual/recorded descriptions of the elements 178. Illustratively, while the client application 112 visually displays an element 178, such as a desk in a virtual office, the narrator application 176 may announce: "you are in an office; there is a desk to your left" for the benefit of the visually impaired user.

As shown, the user profile 116 may include one or more filters 118. In one embodiment, a filter 118 may specify criteria used by the narrator application 176 to select elements 178 to describe using the textual or recorded description. The criteria may be related to a variety of conditions within the virtual world 172, including features of the element 168 (e.g., a proximity of the element 178 to the user's avatar).

In one embodiment, the narrator application 176 describes elements 178 when the characteristics of the element 178 match the criteria specified in a filter 118. For example, a filter 118 may specify that only interactive elements should be described. In such a case, the narrator application 176 might only describe elements 178 of a virtual office such as a door and a person sitting behind a desk, while leaving out descriptions of a plant and a decorative rug.

Storage 108 represents any combination of fixed and/or removable storage devices, such as fixed disc drives, floppy disc drives, tape drives, removable memory cards, flash memory storage, or optical storage. The network interface device 110 may allow network communications between the client 102, the administrator 132, and the virtual world server 162 via the network 190. The input device 120 can be any device to give input to the client 102. For example, a keyboard, keypad, light pen, touch-screen, track-ball, microphone, speech recognition unit, and the like could be used.

The output device 122 can be any device configured to present the virtual world 172 and accompanying elements 178 to the user, e.g., a CRT or LCD monitor along with a set of audio speakers. Although shown separately from the input device 120, the output device 122 and input device 120 could be combined. For example, a display screen with an integrated touch-screen, integrated keyboard, or a speech recognition unit combined with a text-to-speech converter could be used.

Further, in one embodiment, the user may interact with client application 112 and virtual world 172 using a variety of virtual reality interaction devices. For example, the user may don a set of virtual reality goggles that have a screen display for each lens. Further, the goggles could be equipped with motion sensors that cause the view of the virtual world 172 presented to the user to move based on the head movements of the individual. As another example, the user could don a pair of gloves configured to translate motion and movement of the user's hands into avatar movements within the virtual world 172 environment. Of course, embodiments of the invention are not limited to these examples and one of ordinary skill in the art will readily recognize that the invention may be adapted for use with a variety of devices configured to present the virtual world 172 to the user and to translate movement/motion or other actions of the user into actions performed by the avatar representing that user within the virtual world 172.

As stated, embodiments of the invention may assist users with vision impairments in participating in the virtual world 172. For example, textual descriptions of elements 178 displayed in a large font may help users with limited vision to participate in the virtual world experience. Similarly, recorded statements describing elements 178 in the virtual world, or even sound effects appropriate for elements in the virtual world, may be presented to the visually-impaired user. Further, while sighted users may view the virtual world 172 using display devices such as a plasma, an LCD, or a CRT monitor, the virtual world 172 may be described using Braille output devices, or verbally using, e.g., speakers or headphones for users that are blind or with impaired vision. Similarly, for users with impaired hearing, textual descriptions of auditory events may enhance the accessibility of the virtual world for such individuals.

The administrator computer 132 includes a central processing unit (CPU) 134 connected via a bus 147 to a memory 136, a storage 138, a network interface device 140, input device 148, and output device 150. In one embodiment, an administrative user may create and maintain the audio/textual descriptions presented to the client user by the narrator application 176. As shown, the memory 136 of the administrator computer 132 includes a client application 142, a tagger application 146, and an operating system 144. Like client application 112 on client computer system 102, the client application 142 on administrative system 132 may provide a software program that allows a user to connect to a virtual world 172, and once connected, to explore and interact with virtual world 172. Further, client application 142 may be configured to generate and output visual and/or audio representations of elements 178 within the virtual world 172, based on visual and audio descriptions within the virtual world 172.

The tagger application 146 may provide a software application configured to record and store textual and audio descriptions, referred to herein as tags 180, for the elements 178 in the virtual world 172. In turn, the narrator application 176 may present the tags 180 to the certain users interacting with client computer 102 via audio description, e.g., by presenting the audio recording, or generating text-to-speech audio for the visually impaired user.

In one embodiment, users of the virtual world 172 may explore the virtual world 172 and create tags 180 for the elements 178. In one embodiment, the user interface of client applications 112 and 142 may allow users (or administrators) to click on a graphical representation of an element 178 within the virtual world 172 and type in a textual description, i.e., tag 180, of the element 178. In turn, when a visually impaired user encounters the element 178, the narrator application 176 may generate text-to-speech audio, effectively reading the textual description aloud to such a user. Alternately, the user may record an audio description of the element 178 for later playback by the narrator application 176. Further, in addition to the spoken word, users may record or assign sound effects to represent elements of 178 of the virtual world.

In one embodiment, the user may leave the input device 148, such as a microphone, active while exploring the virtual world 172. In turn, the tagger application 146 may record the location of the user's avatar and viewing direction along with spoken descriptions of elements 178. In such a case, the tagger application 146 may be configured to identify what element 178 was being viewed by the user at any given time and associate an appropriate portion of the audio recording with elements 178 of the virtual world 172. In such a case, when the visually impaired user's avatar encounters elements 178 of the virtual world 172 for which tags are available, the narrator application 176 may playback the audio description of the element 178.

Virtual world server 162 generally includes a CPU 164, a memory 166, a storage device 168, and a network interface device 170, coupled to one another by a bus 177. The memory 166 may be a random access memory sufficiently large to hold the necessary programming and data structures that are located on the virtual world server 162. The programming and data structures may be accessed and executed by the CPU 164 as needed to allow users to connect to, and interact with both one another and elements 178 of the virtual world 172.

As shown, the memory 166 includes the virtual world 172, and an operating system 174. Storage 168 represents any combination of fixed and/or removable storage devices, such as fixed disc drives, floppy disc drives, tape drives, removable memory cards, flash memory or optical storage, etc, as well as network or virtualized storage devices.

As shown, storage 168 includes a collection of tags 180. The tags 180 may provide recorded audio or text-based descriptions of the elements 178. In one embodiment, the narrator application 176 may present audible speech from the textual descriptions in the tags 180. Further, the narrator application 176 may present textual descriptions to a user with impaired vision by displaying text in a large font-size.

FIG. 1 is merely one hardware/software configuration for the networked client computer 102, administrator computer 132, and virtual world server 162. Embodiments of the present invention may be adapted for use with a broad variety of computer hardware and software, regardless of whether the computer systems are complicated, multi-user computing apparatus, single-user workstations or network appliances that do not have non-volatile storage.

Figure 2:
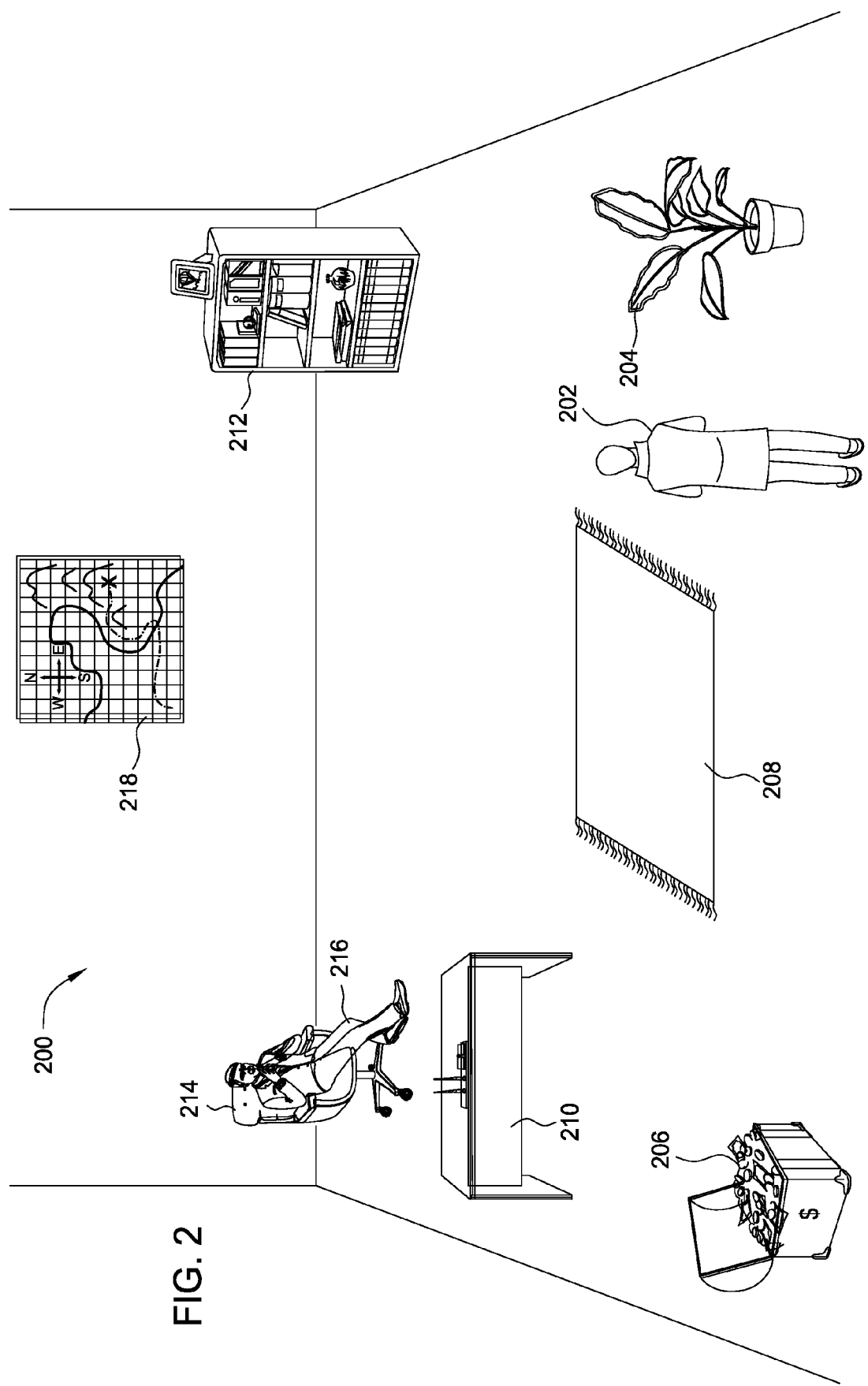
FIG. 2 is an example screen shot of a virtual office that employs tags, filters, and fast filter switching according to one embodiment of the invention.

FIG. 2 is an example screen shot of a virtual office 200 that employs tags to present elements of the virtual office 200 to a visually impaired user, according to one embodiment of the invention. As shown, screen shot 200 includes an avatar 202, and examples of elements 178 of a virtual world. Illustratively, the examples of elements 178 include a potted plant 204, a treasure chest 206, a decorative rug 208, a desk 210, a bookcase 212, a chair 214, another avatar 216, and a treasure map 218.

An immediate problem presented to a user with impaired vision is dealing with a large number of elements 178 with tags 180; namely, the vocalization of many tags 180 could overwhelm the user in quantity and detail. For example, playing audio tags for all the elements 178 in the virtual office 200 may provide too much information for the client user to reasonably process and understand. That is, the presentation of too many tags 180 may degrade the experience for the visually impaired user into just so much noise. Further, the length of a user's encounter with a large set of elements 178 may not provide enough time within which all the elements 178 can be described.

In some embodiments, therefore, only the amount of detail provided in tags 180 that can be understood by the client user in a few seconds may be played. According to one embodiment, the client user may specify a time limit for audio descriptions in the user profile 116.

However, the narrator application 176 may select more elements 178 for description based on the filters 118 than can be described within a user-specified time limit. Accordingly, in one embodiment, the narrator application 176 may prioritize the elements 178 in a user's viewpoint based on the filters 118 and the user profile 116, and only describe the elements 178 of highest priority that can be described within the time limit. In a virtual office 200, a user may move the avatar 202 through the office 200 to another area (or viewpoint) such that the specified time limit exceeds the amount of time that the avatar 202 spends in the office 200. Accordingly, the particular elements 178 visible from a given viewpoint may change before the narrator application 176 completes a description. In such a case, the narrator application 176 may further limit the number of elements 178 described, and/or the level of detail in a description. In one embodiment, the narrator 176 may determine the amount of time available for description based on the avatar's rate of movement and describe only the number of elements 178 (or level of detail) that can be described within the available time. Further, the narrator application 176 may adjust the rate of speaking relative to the rate of movement to accommodate more description in a shorter period of time.

As stated, a filter 118 may specify criteria used by the narrator application 176 to select elements 178 to describe using the textual or recorded description. Example criteria include element characteristics, such as interactive elements, or goal-oriented elements. Thus, an interactive-element filter 118 may be used to specify that the narrator application 176 should describe only interactive elements, i.e., elements with which the user may interact. A goal-oriented filter 118 may be used to specify that the narrator 176 should describe only goal-oriented elements like the treasure map 218, and the treasure chest 206.

In one embodiment, the user may specify when (and which) filters 118 are active at any given time. For example, the user may have defined two filters 118 as described above (one for goal-oriented elements, one for interactive elements). In such a case, the user may set one or more of the filters 118 to be active while exploring the virtual world 172. For example, assume the user makes only the goal-oriented filter active, in such a case, the narrator application 176 may describe only the goal-oriented elements. Further, the user may make both the interactive and goal-oriented filters active at the same time. In such a case, the narrator 176 may describe both the interactive and goal-oriented elements in the office 200: the avatar 216, the treasure chest 206, and the treasure map 218. In some embodiments, the user may employ fast-filter switching to change which filter(s) are active at any point in time. For example, the user may press function keys on a keyboard to quickly activate or de-activate one or more filters 118.

Figure 3:
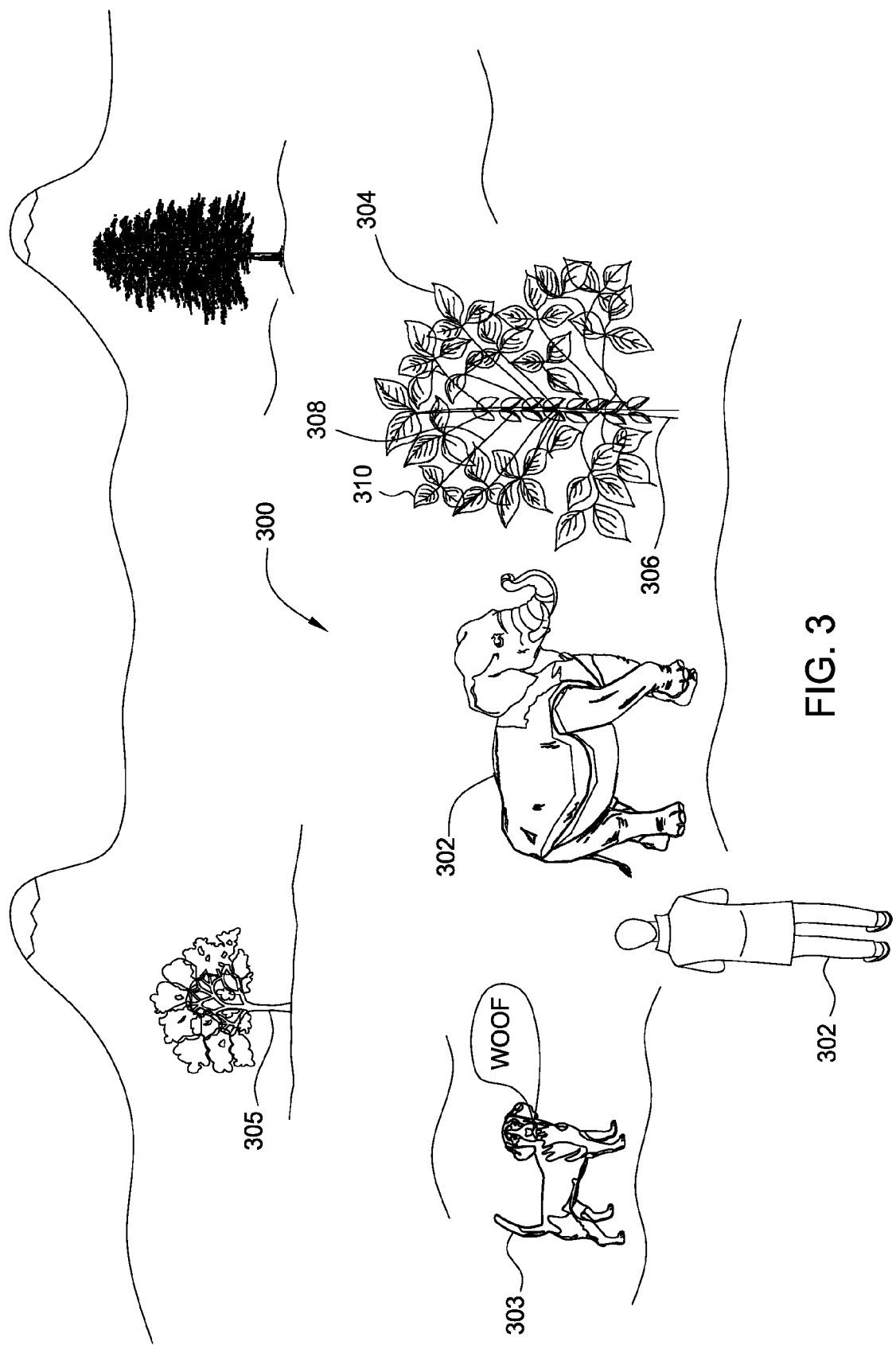
FIG. 3 is an example screen shot of a virtual safari scene that employs tags, according to one embodiment of the invention.

FIG. 3 is an example screen shot of a virtual safari scene that employs tags, filters, and fast filter switching, according to one embodiment of the invention. Scene 300 includes a virtual elephant 302, dog 303, tree 304, and bush 305. Additionally, the tree 304 includes a trunk 306, branches 308, and leaves 310. As described in FIG. 1, the narrator application 176 may be configured to select elements 178 for description based on criteria specified in filters 118. In addition to the goal-oriented criteria and interactive-element criteria, in one embodiment, a user may specify a size criteria for selecting elements 178 to be described by the narrator application 176. Similarly, the user may specify a maximum size, over which elements 178 are not selected for description. For example, in a case where the client user specifies a minimum size criteria, the narrator application 176 may only describe the elephant 302 and the tree 304, and not the dog 303 or the bush 305.

According to one embodiment, the narrator application 176 may provide descriptions as audio representations other than spoken words. For example, instead of saying, "There is an elephant," the narrator application 176 may play the sound of an elephant's trumpeting. Such a sound may be a recording of an actual elephant, or a simulated sound, such as from that a brass trumpet.

In some embodiments, the narrator application 176 may also employ descriptive sound characteristics. For example, an element's size may be reflected in the volume that the narrator's voice uses in describing the element 178. In such a case, the elephant description may be louder than the dog description. The characteristics of the sound of a description may reflect other element characteristics as well. The volume or pitch may reflect the proximity of an element to the client user's avatar. The narrator application 176 may also employ higher volumes to describe elements that are close to the client user's avatar. Further, threatening elements, such as an angry-looking elephant, could be described in a voice with an urgent tone. Those skilled in the art recognize that there are myriad ways in which element characteristics may be reflect as sound characteristics, and these examples are not meant to be inclusive of all possible element-descriptive sound characteristics.

In one embodiment, the sound characteristics of a description may also be associated with user-specified criteria such that the volume of a description may reflect the user's level of interest in a particular element 178. The user may specify such an interest while exploring the virtual world 172, in the user profile 166, or in one or more filters 118. Other possible criteria for the filter 118 may extend to the behavior of an element 178. For example, the user may specify that the narrator application 176 describe elements 178 that are viewing the client's avatar. In such a case, the narrator application 176 may only describe the dog 303 in scene 300. In some embodiments, the client user may specify that the narrator application 176 describe moving elements, where the elephant 303 in scene 300 may be described.

Accordingly, the narrator application 176 may describe element behavior. For example, the narrator application 176 may play the following audio description: "There is a dog staring at you; the dog is barking and breathing heavily." As shown, the narrator 176 may describe element behavior for the hearing-impaired by using a textual description, such as the barking "Woof," bubble next to the dog 303. Typically element behavior may extend to inanimate elements. For example, the narrator application 176 may describe the tree's 'behavior' by play the following audio description: "There is a tree to your right with branches swaying in the breeze."

In one embodiment, the narrator application 176 may describe elements as either whole or component parts based on the user profile 116. For example, where a user specifies a "describe the element as a whole" preference, the narrator application 176 may play the following audio description: "There is a birch tree." Alternately, where the user profile 116 specifies a "describe each component" preference, the narrator application 176 may play the following audio description: "There is a tree, with a white trunk, twelve straight branches, and pointed leaves."

In some embodiments, the narrator application 176 may override a "component description preference" where the time required to provide the component-level of detail exceeds the time limit (either user-specified or rate-of-movement determinative) for description. Further, a client user with a preference for whole description in the user profile 116 may optionally request component detail for described elements through simple selection, such as a mouse click on an element that has been 'wholly described.'

FIG. 4 is an example screen shot of a virtual street scene that employs tags, filters, and fast filter switching, according to one embodiment of the invention. Scene 400 includes avatars 402, 404, and 412, a sidewalk 406, a car 408, a ball 412, and a grassy field 414.

Generally, the virtual world 172 provides a forum where users may communicate and interact with both the virtual world 172 and one another through their individual avatars, such as the communication between avatar 402 and 404 shown in FIG. 4. The mechanisms for communication can take many forms, from simple text chat, e.g., instant messaging, to a voice conversation. In some embodiments, the narrator application 176 may avoid describing elements during a conversation between one avatar 402 and another avatar (e.g., avatars 402 and 204). In other words, like a polite host, the narrator 176 may minimize interruptions during the client user's conversations. For example, in the street scene 400, the narrator 176 may not describe the child 410 bouncing the ball 412 to the client user during the conversation with avatar 404.

However, some element description may override the general practice of not interrupting a conversation, such as when the user's avatar is "threatened" in some way. As shown in FIG. 4, for example, the car 408 appears to be heading directly at the avatar 402. In such a case, the narrator application 176 may be configured to notify the user corresponding to avatar 402 by playing the following audio description: "Pardon the interruption, but a car is heading directly at you from your right." As described in FIG. 3, the volume of the description could increase as the car 408 gets closer to the avatar 402.

In some embodiments, the narrator application 176 may play audio descriptions serially, or in parallel. For example, the narrator application 176 may describe the scene 400 serially as follows, "There is a child bouncing a ball across the street. There is a car approaching from the right." Alternately, parallel descriptions could incorporate sounds other than spoken words to communicate many ideas at once. For example, while saying, "There is a child bouncing a ball," (or alternately, playing the sound of a ball bouncing) the narrator application 176 may play the sound of tires squealing on pavement. Further, the narrator 176 could play the tire sound in the client user's right speaker to communicate the idea that the car 408 is approaching from the avatar's right.

According to one embodiment, the narrator application 176 may describe elements or events by incorporating textures of the virtual world 172. For example, the narrator could communicate the fact that the avatar 402 is walking on a sidewalk, or grass, by playing the sound of footsteps on concrete, or grass. Alternately, the narrator application 176 could say, "You are walking on grass," or repeat the word, "grass," to communicate the same idea.

Figure 5A:
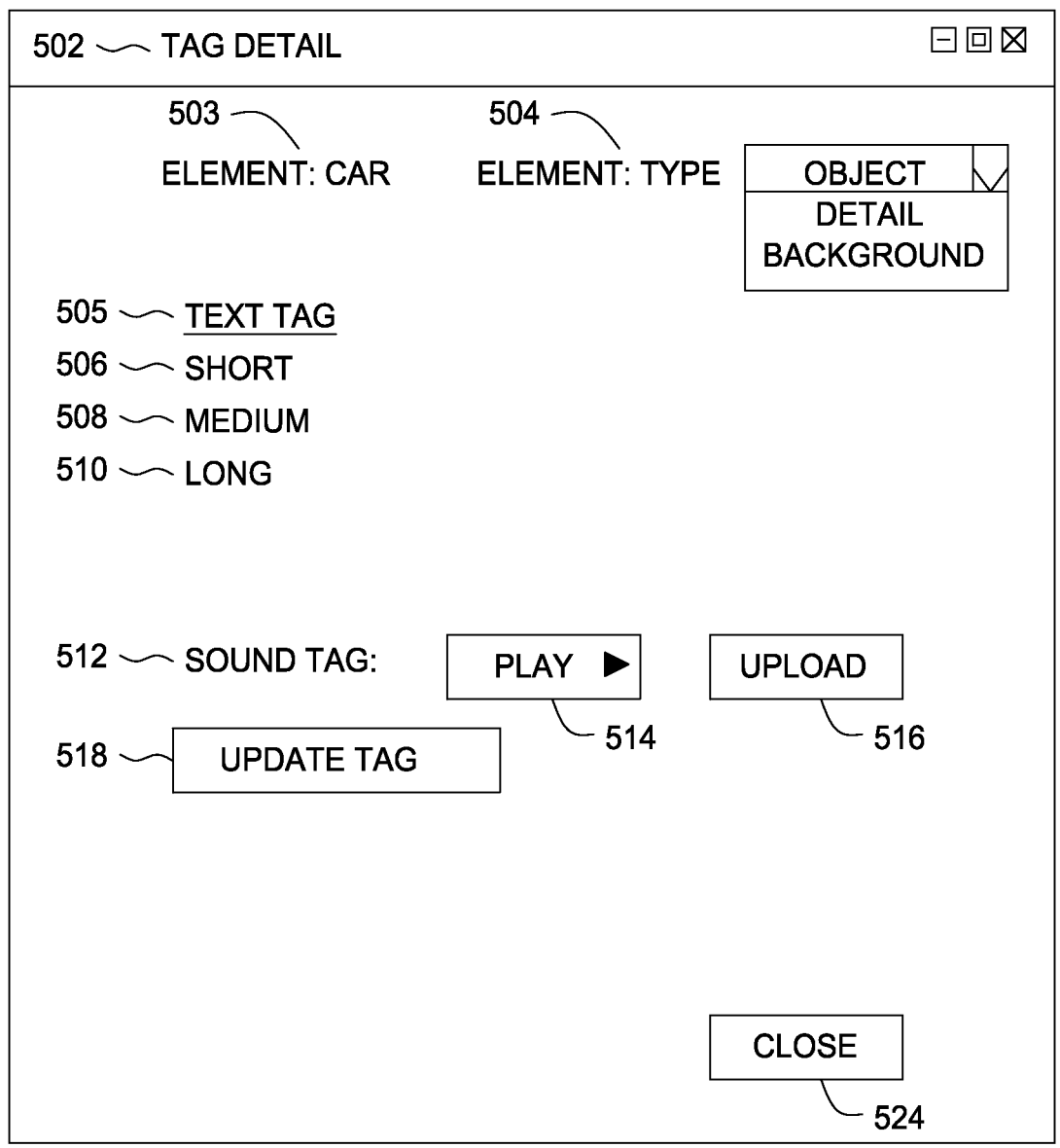
FIG. 5A illustrates an example of a graphical user interface (GUI) for creating tags, according to one embodiment of the invention.

FIG. 5A illustrates an example of a graphical user interface (GUI) 500 for creating tags, according to one embodiment of the invention. As shown, GUI 500 includes a screen title 502, element field 503, element type field 504, text title 505, short text description field 506, medium text description field 508, long text description field 510, sound title 512, sound play button 514, sound upload button 516, update button 518, and close button 524.

In one embodiment, the tagger application 146 may display a GUI 500 for creating tags with fields 506, 508, and 510 left blank in response to a user clicking on an element, e.g., as the car 408 described in FIG. 4. Element field 503 may describe the element selected for tag creation with a simple label. The tag type field 504 may describe the type of tag being created. For example, the tag type may be selected from a simple drop-down list. As described in FIGS. 3 and 4, tags may describe the element itself, a behavior, or a texture. A tag may describe an element with a textual description, provided under text title 504.

Figure 5B:
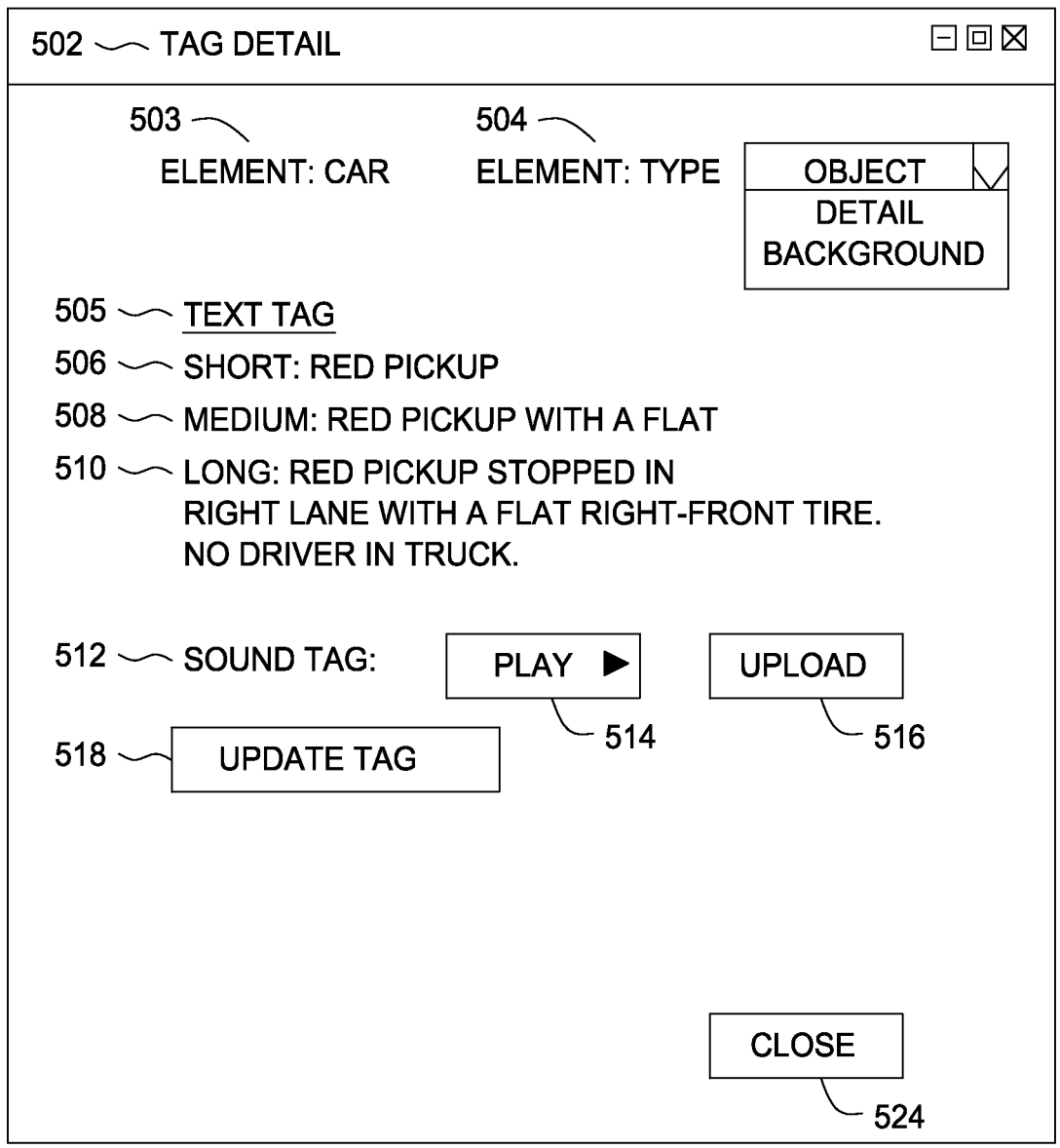
FIG. 5B further illustrates the graphical user interface for creating tags, according to one embodiment of the invention.

FIG. 5B further illustrates the graphical user interface for creating tags, according to one embodiment of the invention. The user may enter the data shown in fields 506, 508, and 510 for creating the tag for car 408. In one embodiment, the user creating the tag may enter three descriptions of increasing detail, short, medium, and long. By providing descriptions using multiple levels of detail, the narrator 176 may select from among the descriptions provided in fields 506, 508, and 510 depending upon the amount of detail requested by a user, or the amount of time available to provide the description.

Alternately, or in addition to the textual description, a user creating a tag may provide a sound for the tag, using the sound field 512. For example, the user may click on the upload button 516 to specify and provide a sound file or to record a sound for the sound tag. In some embodiments, the user creating a tag may verify that the sound is appropriate by clicking on the play button 514 to hear the uploaded sound. In a case where the user wants to change the sound, a different sound can be assigned using the upload button 516 again. Once the user creating the tag enters a textual description and/or a descriptive sound, the update tag button 518 can be clicked, in response to which, the tagger application 146 may create the tag and associate the tag with the element, in this example shown in FIG. 5B, the tag describes the car 408 element shown in FIG. 4.

FIG. 6 is an example GUI 600 for displaying tags associated with the car element 408, according to one embodiment of the invention. As shown, GUI 600 includes a title 602, an element description 604, a user field 606, a tag rating field 608, a user rating field 610, tags 612 and a view tag button 614. In one embodiment, a user may view all tags associated with a given element, in this example, the car 408 described in FIG. 4. In some embodiments, the tagger application 146 may display GUI 600 in response to a right-click on a virtual world element. Illustratively, the tags 612 of the car are described by user 606, tag rating 608, and user rating 610. The tag rating 608 may provide an average rating of this tag, as rated by multiple users. The user rating 610 may be an average rating of all tags created by a given user, as rated by other users.

In one embodiment, the narrator application 176 may select a tag from among multiple tags for the same element 408 based on the tag rating 608. In other words, the narrator application 176 may generally describe an element using the tag with the highest rating. In a case where more than one tag shares the highest rating, the narrator application 176 may select from among the tags by using user profile 116 or user filter criteria 118. For example, a visually impaired user may be expected to prefer tags created by users with a high user rating 610 over tags created by users with a low user rating 610, or may prefer tags from a well-known user (e.g., a friend of the visually impaired user) even if not highly rated. In some embodiments, to view a particular tag, the user may select one of the tags displayed in GUI 600 and click on the view tag detail button 614.

Figure 7:
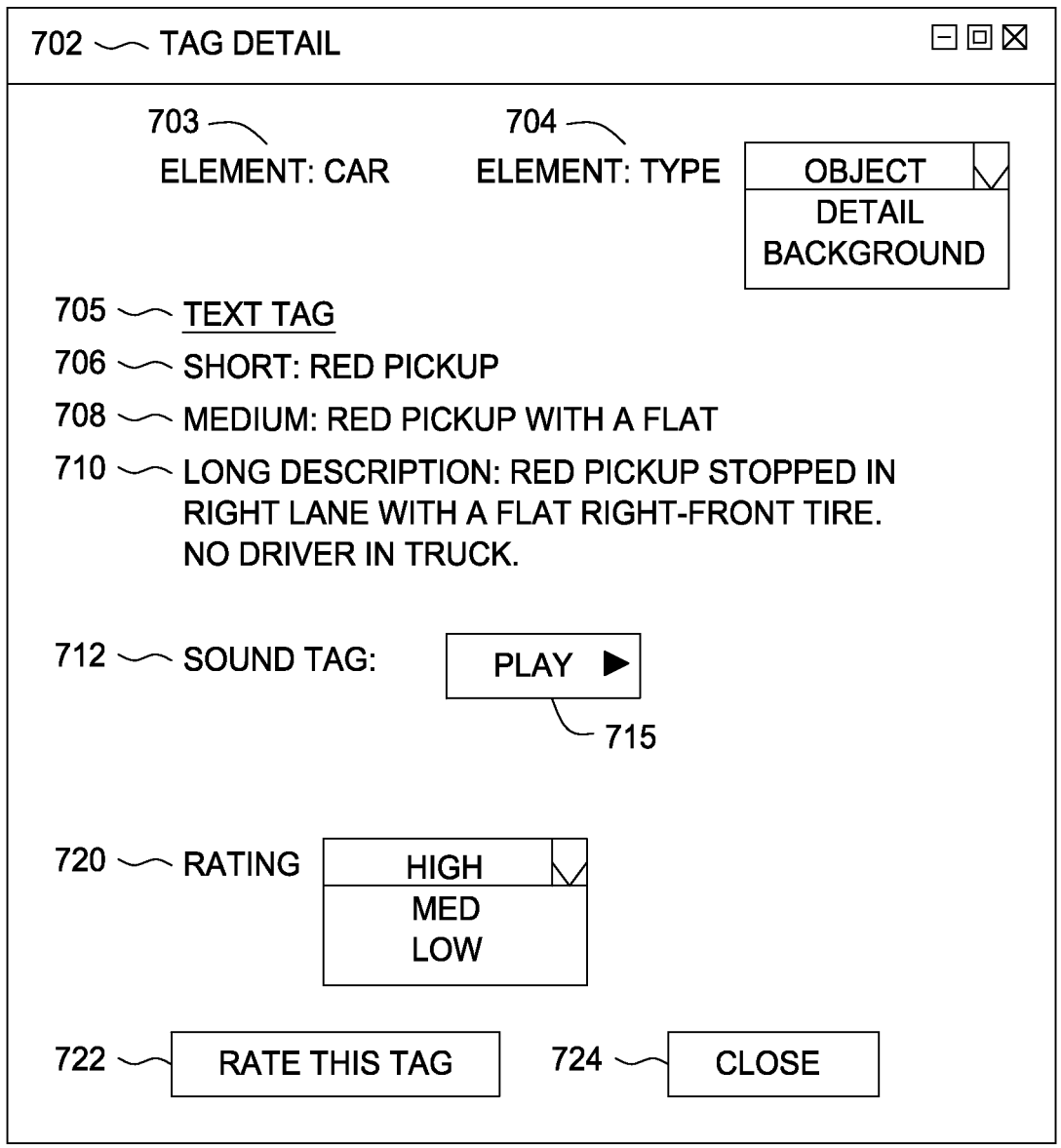
FIG. 7 further illustrates the example graphical user interface for rating a tag, according to one embodiment of the invention.

FIG. 7 is an example GUI 700 for rating one of the tags 612, according to one embodiment of the invention. In response to a user clicking on the "view tag detail" button 614, the tagger application 146 may display GUI 700. GUI 700 is similar to the GUI 500 described in FIG. 5, with the addition of a tag rating field 520, and a rate tag button 522. The user may review the text fields 706, 708 and 710 to determine a rating they believe is appropriate for a given tag. The user may also listen to a sound recording associated with the tag by pressing the play button 714. In some embodiments, the rating may be selected from a drop-down list of three choices, high, medium, and low. As shown, the user may assign their rating by clicking on the rate this tag button 722. By clicking on the close button 724, the user may return to the GUI 600. In one embodiment, the tagger application 146 may be configured to evaluate the rating from multiple users to decide an overall rating for a given tag 180. Further, the tagger application 146 may be configured to create a rating for "taggers" by evaluating the rating of multiple tags created by the same user. For example, FIG. 6 shows that "John Smith" has a "HIGH" rating, meaning that other users have rated tags created by "John Smith" highly.

Figure 8:
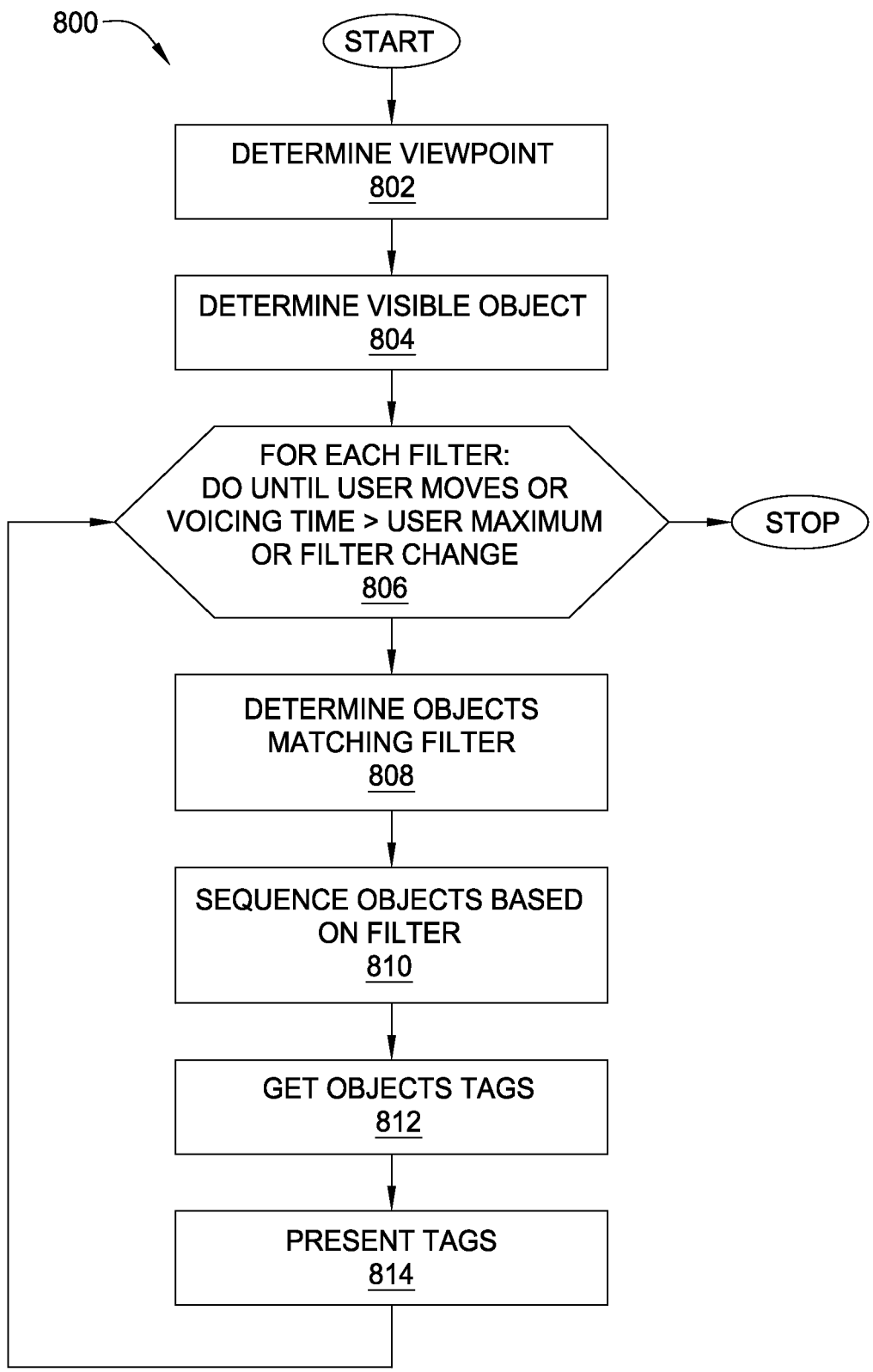
FIG. 8 is a flowchart illustrating a process for describing elements in a virtual world, according to one embodiment of the invention.

FIG. 8 is a flowchart illustrating a method 800 for describing elements in a virtual world, according to one embodiment of the invention. As shown, method 800 begins at step 802, where the narrator application 176 determines the viewpoint of a client user's avatar. The viewpoint may depend on the avatar's geographical position within the virtual world, and the viewing angle. At step 804, the narrator application 176 determines the elements that are visible to the avatar based on the viewpoint. For example, within a virtual room, a virtual space, only a limited number of elements are visible to an avatar given the avatar's viewpoint.

At step 806, a loop begins for each filter that the client user has active. However, if the avatar moves, the user de-activates the remaining filters, or the time limit for element description is exceeded, the loop 806 stops. At step 808, the narrator determines which of the visible elements determined in step 804 match any active filter criteria for the user.

At step 810, the narrator application 176 creates a description sequence for the elements by prioritizing the elements according to user preferences in the user profile 116 and the user filter 118. At step 812, the narrator 176 retrieves the tags that to use for describing the elements determined at step 808. At step 814, the narrator 176 describes the elements based on the descriptions in the tags retrieved at step 812.

Figure 9:
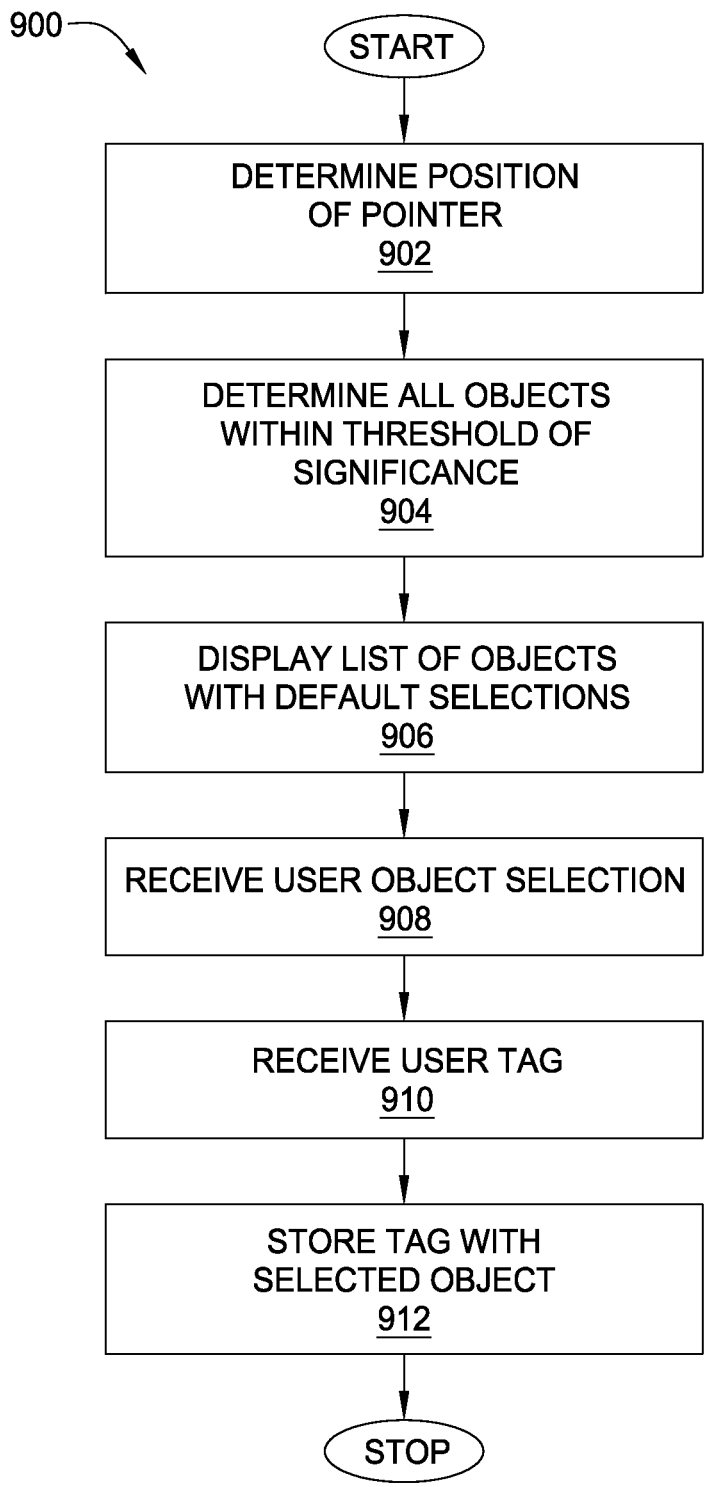
FIG. 9 is a flowchart illustrating a process for creating tags for elements in a virtual world, according to one embodiment of the invention.

FIG. 9 is a flowchart illustrating a method 900 for creating tags for elements in a virtual world, according to one embodiment of the invention. As shown, the method 900 begins at step 901, where the tagger application 146 may receive a request from a user to create a tag for a selected element.

In one embodiment, the tagger application 146 may need to identify which element has been selected for tagging. Accordingly, at step 902, the tagger 146 may determine the current position of the user's mouse cursor at the time of the request. At step 904, the tagger application 146 may determine which elements are within a proximity threshold of the pointer position. The proximity threshold may be a user-specified distance, or a default distance that varies according to particular implementations of embodiments of the invention. At step 906, the tagger application 146 may present the user with a list of the elements that are within the proximity threshold. In one embodiment, the tagger application 146 may highlight a default selection. Once the elements of the virtual world are highlighted, the user may select which one of the elements the user desires to create a tag for.

At step 908, the tagger application 146 may receive a selection of an element of the virtual world. In response, at step 909, the tagger application 146 may display the tag entry GUI, such as GUI 500 described in FIG. 5. At step 910, the tagger 146 may receive the element description from the user. At step 912, the tagger 146 may store the tag, and associate the tag with the selected element.

Advantageously, embodiments of the invention may be used to enhance the experience of a virtual world for certain users. For example, visually impaired users may explore and experience a virtual world through tags that provide audio descriptions of the various elements of their avatars' experiences. Further, tags may be created by users within a social network, whereby a user may prefer tags created by known users or friends. Additionally, tags may be rated by members of the social network according to a tag's usefulness, e.g., adequacy of description, to users. Further, although primarily described to enhance the experience of a visually impaired user, the same techniques described herein may be adapted to enhance the experience of users with other disabilities. For example, tags for audio events, e.g., a dog barking, may be created with a textual description and presented to users with hearing impairments.

While the foregoing is directed to embodiments of the present invention, other and further embodiments of the invention may be devised without departing from the basic scope thereof, and the scope thereof is determined by the claims that follow.

What is claimed is:

1. A method of generating a tag used to describe an element of a virtual world to a first user of the virtual world, the method comprising:
   identifying a selection, made by a second user, of an element of the virtual world, wherein the selected element is accessible by, and distinct from, an avatar controlled by the second user;
   receiving a description of the element from the second user, wherein the description characterizes one or more audio-visual attributes of the element;
   generating a tag that includes the description and is associated with the selected element of the virtual world, wherein the tag specifies a plurality of categories used to classify descriptions based on a predetermined estimated amount of detail that can be understood by a user in a predetermined amount of time; and
   storing the tag in a manner that makes the tag accessible to the first user.

2. The method of claim 1, further comprising associating the tag describing the element of the virtual world with the second user.

3. The method of claim 2, further comprising:
   determining a rating for the tag, based on a rating associated with a plurality of descriptions created by the second user; and
   associating the rating with the tag.

4. The method of claim 1, wherein the description of the element comprises one of an audio recording describing the element of the virtual world and a textual description of the element of the virtual world.

5. The method of claim 1, wherein the tag comprises a plurality of descriptions of the element received from one or more users, wherein the plurality of descriptions comprises one of a plurality of audio recordings describing the element and a plurality of textual descriptions, and wherein each of the plurality of descriptions has a differing length and provides a description of the element of the virtual world using a different level of detail.

6. The method of claim 1, wherein identifying the selection of the element comprises:
   identifying a user selection of a position within the virtual world;
   determining a plurality of elements of the virtual world within a predefined distance of the selected position;
   presenting a list of the plurality of elements to the second user; and
   receiving a selection of an element from the list.

7. A computer-readable storage medium containing a program which, when executed, performs an operation for generating a tag used to describe an element of a virtual world to a first user of the virtual world, the operation comprising:
   identifying a selection, made by a second user, of an element of the virtual world, wherein the selected element is accessible by, and distinct from, an avatar controlled by the second user;
   receiving a description of the element from the second user, wherein the description characterizes one or more audio-visual attributes of the element;
   generating a tag that includes the description and is associated with the selected element of the virtual world, wherein the tag specifies a plurality of categories used to classify descriptions based on a predetermined estimated amount of detail that can be understood by a user in a predetermined amount of time; and
   storing the tag in a manner that makes the tag accessible to the first user.

8. The computer-readable storage medium of claim 7, wherein the operation further comprises, associating the tag describing the element of the virtual world with the second user.

9. The computer-readable storage medium of claim 8, wherein the operation further comprises:
   determining a rating for the tag, based on a rating associated with a plurality of descriptions created by the second user; and
   associating the rating with the tag.

10. The computer-readable storage medium of claim 7, wherein the description of the element comprises one of an audio recording describing the element of the virtual world and a textual description of the element of the virtual world.

11. The computer-readable storage medium of claim 7, wherein the tag comprises a plurality of descriptions of the element received from one or more users, wherein the plurality of descriptions comprises one of a plurality of audio recordings describing the element and a plurality of textual descriptions, and wherein each of the plurality of descriptions has a differing length and provides a description of the element of the virtual world using a different level of detail.

12. The computer-readable storage medium of claim 7, wherein identifying the selection of the element comprises:
   identifying a user selection of a position within the virtual world;
   determining a plurality of elements of the virtual world within a predefined distance of the selected position;
   presenting a list of the plurality of elements to the second user; and
   receiving a selection of an element from the list.

13. A system comprising:
   a processor; and
   a memory containing a program which, when executed by the processor, is configured to generate a tag used to describe an element of a virtual world to a first user of the virtual world by performing an operation, comprising:
      identifying a selection, made by a second user, of an element of the virtual world, wherein the selected element is accessible by, and distinct from, an avatar controlled by the second user;
      receiving a description of the element from the second user, wherein the description characterizes one or more audio-visual attributes of the element;
      generating a tag that includes the description and is associated with the selected element of the virtual world, wherein the tag specifies a plurality of categories used to classify descriptions based on a predetermined estimated amount of detail that can be understood by a user in a predetermined amount of time; and
      storing the tag in a manner that makes the tag accessible to the first user.

14. The system of claim 13, wherein the operation further comprises associating the tag describing the element of the virtual world with the second user.

15. The system of claim 14, wherein the operation further comprises:
   determining a rating for the tag, based on a rating associated with a plurality of descriptions created by the second user; and
   associating the rating with the tag.

16. The system of claim 13, wherein the description of the element comprises one of an audio recording describing the element of the virtual world and a textual description of the element of the virtual world.

17. The system of claim 13, wherein the tag comprises a plurality of descriptions of the element received from one or more users, wherein the plurality of descriptions comprises one of a plurality of audio recordings describing the element and a plurality of textual descriptions, and wherein each of the plurality of descriptions has a differing length and provides a description of the element of the virtual world using a different level of detail.

18. The system of claim 13, wherein identifying the selection of the element comprises:
   identifying a user selection of a position within the virtual world;
   determining a plurality of elements of the virtual world within a predefined distance of the selected position;
   presenting a list of the plurality of elements to the second user; and
   receiving a selection of an element from the list.

19. The method of claim 4, wherein the description of the element is an audio recording, and wherein generating a tag comprises associating the description of the element with the current location and the viewing direction of the avatar controlled by the second user.

20. The computer-readable storage medium of claim 10, wherein the description of the element is an audio recording, and wherein generating a tag comprises associating the description of the element with the current location and the viewing direction of the avatar controlled by the second user.

21. The system of claim 16, wherein the description of the element is an audio recording, and wherein generating a tag comprises associating the description of the element with the current location and the viewing direction of the avatar controlled by the second user.

22. The method of claim 1, wherein the predetermined amount of time is based on a rate of movement of an avatar controlled by the first user.

23. The computer-readable storage medium of claim 7, wherein the predetermined amount of time is based on a rate of movement of an avatar controlled by the first user.

24. The system of claim 13, wherein the predetermined amount of time is based on a rate of movement of an avatar controlled by the first user.

\* \* \* \* \*